3,281,471
PROCESS OF PRODUCING ETHYLENE DIAMINE
Pierre Chassaing, Paris, and Jean Coillard, Saint-Auban, Basses-Alpes, France, assignors to Produits Chimiques Pechiney-Saint-Gobain, Neuilly-sur-Seine, France
No Drawing. Filed June 10, 1963, Ser. No. 286,493
Claims priority, application France, June 18, 1962, 901,084
12 Claims. (Cl. 260—583)

This invention relates to the preparation of ethylene diamine and it relates more particularly to an improvement in the process for the preparation of ethylene diamine by reaction from acetyl monohalogeno chloride and by reduction thereof to produce ethylene diamine.

It is known to prepare ethylene diamine by the reaction of ammonia with dichloro- or dibromo-ethane in a gaseous or anhydrous phase, under a pressure of about 40 kg./cm.$^2$ in aqueous medium and under a pressure of 100 kg./cm.$^2$ in anhydrous medium, and at temperatures in the order of 100° C. to 110° C. A preponderance of secondary, tertiary, cyclic or acyclic amine bases are formed. In order to reduce the formation of these undesirable products of side reactions, it has been proposed to work in the presence of a large excess of ammonia, about 40 times the theoretical amount required. Nevertheless, a high percentage of the transformation products of dichloro- or dibromo-ethane is still obtained, about 25% by weight of higher amines such as diethylene triamine or triethylene tetramine. Moreover, very costly apparatus is required since the apparatus is required to resist corrosive media in addition to its operation under high pressure.

In addition, the ethylene diamine, formed in aqueous medium, is required to be separated by distillation and thus involves considerable expense from the standpoint of the expenditure of heat since water is the first top distillation fraction. Finally, an azeotropic mixture of water and ethylene diamine, containing only 80% by weight of ethylene diamine, is secured.

It is an object of this invention to produce and to provide a method for producing ethylene diamine which is free of many, if not all, of the deficiencies previously described and it is a related object to provide a method and means for the production of ethylene diamine and intermediate products in its manufacture, in a simple and efficient process, wherein high yields are secured at minimum expense.

In order to obviate the various drawbacks described, the applicants have devised a simple process which makes it possible to secure good yields in ethylene diamine and which offers advantages which will be apparent from the following description.

In compliance with the process for obtaining ethylene diamine in accordance with the practice of this invention, chloracetamide is reacted with gaseous ammonia and/or anhydrous liquid ammonia at a temperature within the range of —20° C. to +50° C. and preferably at a temperature between +10° C. and +30° C., under a pressure greater than 1 kg./cm.$^2$ to obtain the corresponding aminoacetamide or its hydrochloride derivative. The aminoacetamide or its derivative is then reduced by a reduction reaction to free ethylene diamine. The chloracetamide can be prepared by various known means, such as by the reaction of ammonia with ethyl monochloracetate. However, the applicants have devised a more efficient method for the preparation of chloracetamide in a form which is more amenable to the further concepts of this invention in the manufacture of ethylene diamine therefrom.

This method consists essentially in reacting a monohalogeno acetyl chloride with ammonia. This method is simple and it is preferred because it becomes unnecessary to carry out the previous isolation of the formed chloroacetamide in order to obtain ethylene diamine in accordance with the practice of this invention. The chloracetamide may be considered as an intermediate product in the reaction to form ethylene diamine but it might also be considered as an end product for other uses.

According to an embodiment of this invention, the chloracetamide is prepared by reacting gaseous ammonia with 1 mole of monochloracetyl chloride with agitation, at a temperature within the range of —20° C. to +50° C. and preferably within the range of 0° C. to +10° C., until the gaseous ammonia is no longer absorbed by the reaction medium.

To this reaction medium there is then added 10 to 40 molecular weights of anhydrous liquid ammonia. Gaseous ammonia may also be used if sufficient pressure is employed to maintain the ammonia in a liquid state in the reaction medium. The ammonia reaction is in the form of an ammonolysis of chloracetamide to form the corresponding amino-acetamide. The ammonolysis is carried out at a temperature, as defined above, such as between —20° C. to +50° C. and preferably between +10° C. to +30° C., and under a pressure preferably within the range of 4 to 7 kg./cm.$^2$, with vigorous agitation. These conditions are maintained for a period of time of about 5 to 45 minutes and preferably from 10 to 30 minutes, so that the aminoacetamide hydrochloride will be obtained. The hydrochloride is treated with the necessary quantity of an alkali or base, according to well known methods of neutralization, to liberate aminoacetamide.

The reduction of the aminoacetamide to ethylene diamine is then carried out. For this purpose, the applicants have found a new process for reduction in which the aminoacetamide is treated, preferably in liquid phase, such as in an alcoholic medium, and in the presence of a catalyst such as Raney nickel, at a temperature within the range of 50° C. to 150° C. and preferably about 100° C. It is possible to carry out the reduction reaction on the aminoacetamide hydrochloride itself, which leads to ethylene diamine hydrochloride and to then release the ethylene diamine by reaction with a suitable alkali or base. Any conventional reducing reaction for conversion of the amides into amines can also be used, such as reduction in gaseous phase on divided nickel or copper as the catalyst.

By way of variation of the process of this invention, the reaction to form chloracetamide and aminoacetamide may be carried out in a single operation. For this purpose, the proportions of about 2 moles of ammonia, preferably in the gaseous state, are reacted with 1 mole of monochloracetyl chloride. The operations as described above are thereafter repeated for the ethylene diamine formation.

The process of this invention offers the possibilities of obtaining yields of ethylene diamine in the order of 90% by weight of theoretical or higher.

The following examples are given by way of illustration, but not by way of limitation, of this invention.

*Example 1*

1 molecular weight of monochloracetyl chloride is introduced into a reactor which is externally cooled to about 0° C., as by means of heat exchange with a cold brine. 2 molecular weights of gaseous ammonia are passed through the reactor while energetically stirring the reaction medium until the absorption of ammonia ceases. Thereafter, 40 molecular weights of liquid ammonia are added. The reactor is sealed and the temperature is raised to 10 to 12° C. and the internal pressure is allowed to rise to 5 to 6 kg./cm.² The agitation is continued for about 30 minutes and then the reactor is brought to atmospheric pressures and the excess ammonia is evacuated at ambient temperature. A solid mixture of aminoacetamide hydrochloride and of ammonium chloride is thus obtained.

This solid mixture is treated with 200 cm.³ of ethyl alcohol in which about 80 grams of sodium hydroxide are dissolved. This medium is filtered to eliminate insoluble mineral salts. The aminoacetamide, which is in the alcoholic solution, is reduced at 100° C. in the presence of Raney nickel catalyst. The ethyl alcohol is separated by distillation and 54 grams of ethylene diamine are finally obtained, giving a yield of about 90% by weight.

*Example 2*

1 molecular weight of monochloracetyl chloride is combined with 1.2 molecular weights of ethyl alcohol at ambient temperature. The materials react substantially instantaneously to form ethyl monochloracetate along with hydrochloric acid. The reaction medium is washed with water until hydrochloric acid is eliminated. The ethyl monochloracetate is decanted and then introduced into a reactor containing 30 molecular weights of anhydrous liquid ammonia. The reactor is closed, the liquid medium is stirred, and its temperature brought to 10 to 12° C. by means of circulation of cold water about the reactor. When the pressure within the reactor reaches 6 kg./cm.², stirring is continued for about 30 minutes and then the pressure is released by opening the reactor to the atmosphere with the corresponding release of excess ammonia by volatilization. Crystals of aminoacetamide chlorhydrate are separated by filtration and the subsequent operations are identical to those described in Example 1 for the conversion thereof to ethylene diamine. The yield in ethylene diamine corresponds to 90% by weight of theoretical.

It will be understood that the foregoing are given by way of illustration and not by way of limitation and that changes may be made in the details of formulations and reaction conditions without departing from the spirit of the invention, especially as defined in the following claims.

We claim:
1. A process for obtaining ethylene diamine comprising reacting chloracetamide with ammonia at a temperature within the range of −20° C. to +50° C. and under a pressure higher than 1 kg./cm.² to form a compound selected from the group consisting of aminoacetamide and its hydrochloride derivative, and subjecting the reaction product to a reduction reaction to form a compound selected from the group consisting of ethylene diamine and its hydrochloride derivative, and then neutralizing the product with an alkali to liberate ethylene diamine.

2. A process in accordance with claim 1 in which the chloracetamide is reacted with ammonia in the molecular ratio of from 1 mole of chloracetamide to 10–40 moles of ammonia.

3. A process as claimed in claim 1 in which the chloracetamide is reacted with ammonia at a temperature within the range of 10° C. to 30° C.

4. A process as claimed in claim 1 in which the chloracetamide is reacted with ammonia under a pressure within the range of 4 to 7 kg./cm.²

5. A process as claimed in claim 1 in which the chloracetamide is reacted with ammonia with agitation for a period of time ranging from 5 to 50 minutes.

6. A process as claimed in claim 1 in which the reduction reaction is carried out in a liquid state in the presence of Raney nickel.

7. A process as claimed in claim 1 in which the reduction reaction is carried out in a liquid alcoholic medium at a temperature within the range of 50° C. to 150° C.

8. A process as claimed in claim 1 in which the reduction reaction is carried out in a liquid alcoholic medium in the presence of a reducing catalyst and at a temperature of about 100° C.

9. A process as claimed in claim 1 in which the chloracetamide is formed by the reaction of ammonia with chloracetyl chloride and in which the chloracetamide and the aminoacetamide reactions are carried out in a single step by reaction of about 2 moles of ammonia with 1 mole of monochloracetyl chloride and then introducing into said reaction medium about 10 to 40 moles of ammonia.

10. A process as claimed in claim 1 in which the chloracetamide is formed by the reaction of ammonia with chloracetyl chloride and in which the chloracetamide and the aminoacetamide reactions are carried out in a single step by reaction of ammonia with monochloroacetyl chloride and then introducing ammonia into the reaction medium.

11. A process as claimed in claim 10 in which the reaction is carried out with agitation at a temperature within the range of −20° C. to +50° C.

12. A process as claimed in claim 10 in which the reaction is carried out with gaseous ammonia at a temperature within the range of 0° C. to 10° C.

References Cited by the Examiner

Bergell et al.: Chem. Abstracts, vol. 5 (1911), p. 1591.
Jacobs et al.: Organic Synthesis, Collective Vol. I, Second Edition (1941), J. Wiley and Sons Inc., New York, pp. 153, 154.
Wagner et al.: Synthetic Organic Chemistry, J. Wiley and Sons Inc. (1953), p. 660.

CHARLES B. PARKER, Primary Examiner.
ANTON H. SUTTO, Assistant Examiner.